July 31, 1956  H. T. LATHROP  2,756,495
METHOD OF ASSEMBLING WHEEL AND BEARING PARTS AS A UNIT
Filed June 2, 1953
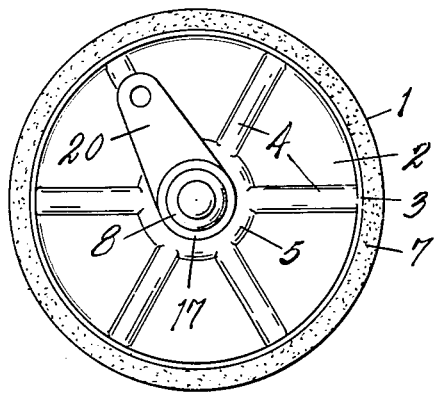
Fig. 1.
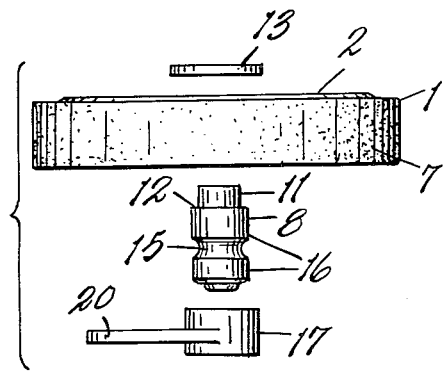
Fig. 2.
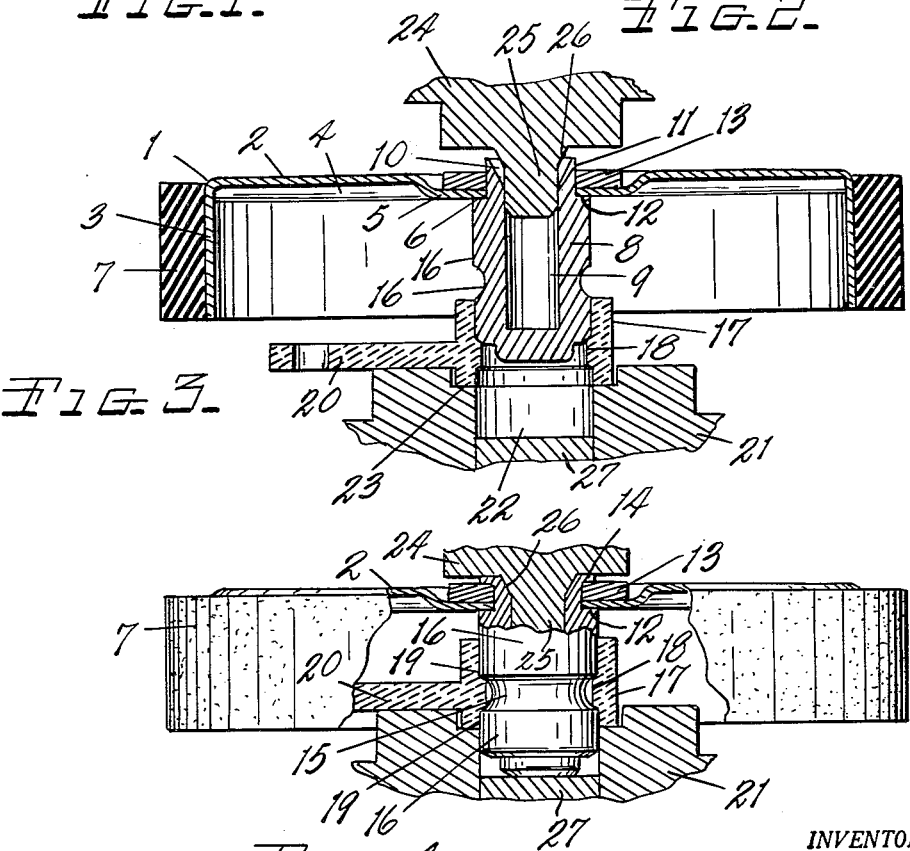
Fig. 3.
Fig. 4.
INVENTOR.
Henry T. Lathrop
BY
Otto A. Earl
Attorney.

United States Patent Office 2,756,495
Patented July 31, 1956

2,756,495

METHOD OF ASSEMBLING WHEEL AND BEARING PARTS AS A UNIT

Henry T. Lathrop, Grand Rapids, Mich., assignor to Bissell Carpet Sweeper Company, Grand Rapids, Mich.

Application June 2, 1953, Serial No. 359,191

5 Claims. (Cl. 29—450)

This invention relates to a method of assembling wheel and bearing parts as a unit.

The main objects of this invention are:

First, to provide a method of assembling wheel and bearing parts as a unit which are particularly adapted for use as floor and brush driving wheels in carpet sweepers.

Second, to provide a method of assembling wheel and bearing parts as a unit, the bearing parts being of resiliently expandable plastic desirably nylon, which greatly expedites and economizes manufacture.

Third, to provide a method having these advantages which may be practiced by a punch press operator or on a punch press type of machine and results in a very uniform product.

Objects relating to details and economies of the invention will appear from the description to follow. The invention is defined and pointed out in the claims.

A preferred embodiment of the invention is illustrated in the accompanying drawing, in which:

Fig. 1 is a side elevational view of an assembled wheel unit produced by my method and adapted for use in a carpet sweeper.

Fig. 2 is an exploded view of parts adapted to be assembled into a unit by my method.

Fig. 3 is an enlarged vertical section illustrating structural details of the parts and of an apparatus for practicing the method in partially actuated position.

Fig. 4 is an enlarged fragmentary view partially in section illustrating the parts in completely assembled relation and the machine or apparatus in fully actuated position.

The assembled unit produced by the method of my invention as illustrated in the accompanying drawing is a floor wheel for a carpet sweeper of the type, for example, such as shown in the Pullen Patent 2,418,725 issued April 8, 1947.

The wheel designated generally by the numeral 1 comprises the web 2 and an integral flange-like rim 3 formed as an integral sheet metal stamping. The web has radial reinforcing ribs 4 radiating from the annular inset portion 5 surrounding the opening 6.

The wheel illustrated is provided with a rubber tire 7. The wheel hub 8 has a shaft receiving bore 9 which is outwardly beveled at 10.

The hub has a reduced portion 11 terminating in an annular shoulder 12. The opening 6 in the web 2 is of such diameter as to receive the reduced portion of the hub. A disc-like reinforcing collar 13 is arranged on the reduced portion of the hub and, as shown, is of such thickness as to seat within the inset portion 5 of the web. The internally beveled end portion 10 of the hub is upset, as shown at 14 upon the collar 13, as is best shown in Fig. 4.

The hub has an annular peripheral groove 15 spaced from the outer end, there being bearing surfaces 16 at each side of the groove. The bearing member 17 is formed of expandably resilient plastic, desirably molded nylon and has an internal rib 18 retainingly engaging the groove 15 of the hub, as shown in Fig. 4, with bearing portions 19 of the bearing coacting with the bearing portions or surface 16 of the hub.

The bearing illustrated is provided with an arm 20 adapted to be engaged by a spring such as is shown in the Pullen patent for urging the wheel into coacting relation with a driven pulley on a rotatable brush.

The assembled unit illustrated is that of the copending application of Richard K. Butler, Serial No. 363,714 filed June 24, 1953.

The method of my invention is well adapted for use in assembling wheel and bearing units of the character shown in that application.

The method comprises the steps of providing a wheel with the web having central openings surrounding by an inset portion, providing a hub having the features of characteristics heretofore described.

A desirable apparatus for the assembly of the parts by my method comprises the bed or support member 21 having a recess 22 shouldered at 23 to receive the bearing member 17. The ram 24 is provided with a pilot 25 having a conical base portion 26 adapted to be received within the beveled portion 10 of the hub bore 9. The support 21 and the ram 24 may be embodied in or installed in a punch press of known type.

The bearing member is placed on the support, as shown in Figs. 3 and 4, and the hub is inserted therein above the rib and resting thereon, as shown in Fig. 3. The wheel is placed on the reduced portion of the hub and the collar placed on the projecting end of the reduced portion, as shown in Fig. 3. The ram is then actuated to apply end thrust to the hub which forces it through the bearing member into supported engagement with the bottom 27 of the recess, as shown in Fig. 4.

Continued thrust of the ram upsets the beveled end of the hub upon the collar clamping the web of the wheel between the collar and shoulder 12 of the hub, as shown in Fig. 4.

As stated, the bearing member is elastically or resiliently expandable and is desirably formed of nylon. This quality permits the inserting of the outer end of the hub through the internal rib which retainingly engages the groove in the hub.

It will be understood that the assembling of the parts for positioning in the machine may be varied. For example, the wheel web, hub and collar may be assembled prior to positioning the hub in the bearing member as shown in Fig. 3 and that may be a desirable practice for line assembly, that is, the wheel web, hub and collar may be assembled at one station and translated to the final assembly station where the punch press or other machine is located.

It is desirable when the bearing is formed of nylon, as is preferred on account of the fact it does not require lubricant to thoroughly moisten the bearing. This reduces breakage.

My method not only enables very rapid assembly of the wheel and bearing parts as a unit but it results in a great uniformity of product. While the method is particularly well adapted for the assembling of wheel and bearing parts for use in carpet sweepers it will be appreciated that it is adapted for producing wheel assemblies for other uses.

I have illustrated and described my invention as embodied in a commercial structure. I have not attempted to illustrate or describe other adaptations as it is believed that this disclosure will enable those skilled in the art to embody or adapt my invention as may be desired.

Having thus described my invention, what I claim as new and desire to secure by Letters Patent is:

1. The method of assembling wheel and bearing parts as a unit comprising the steps of providing a wheel having a web with a central opening surrounded by an annular inset portion, providing a rigid hub with a bore beveled at one end, the hub having an externally reduced portion at the same end terminating in an annular shoulder and having an annular peripheral groove spaced from its other end, positioning the reduced end portion of the hub in the opening in the wheel web, positioning an annular disc-like collar on the reduced portion of the hub and within the insert portion of the web, providing a bearing member of nylon having an internal rib adapted to be received in the groove in the hub, inserting the outer end of the hub in the bearing member above the rib therein and seating the bearing member on a support having a recess therein, and applying endwise thrust to the other end of the hub to expandably force the hub through the bearing member and into supported engagement with the bottom of the recess of the support when the rib of the bearing member is within the groove of the hub and thereafter upset the internally beveled end of the hub upon the said collar and clamp the wheel web between the shoulder of the hub and said reinforcing member.

2. The method of assembling wheel and bearing parts as a unit comprising the steps of providing a wheel having a web with a central opening, providing a rigid hub with a bore beveled at one end, the hub having an externally reduced portion at the same end terminating in an annular shoulder and having an annular peripheral groove spaced from its other end, positioning the reduced end portion of the hub in the opening in the wheel web, positioning a collar on the reduced portion of the hub, providing a bearing member of nylon having an internal rib adapted to be received in the groove in the hub, inserting the outer end of the hub in the bearing member above the rib therein and seating the bearing member on a support having a recess therein, and applying endwise thrust to the other end of the hub to expandably force the hub through the bearing member and into supported engagement with the bottom of the recess of the support when the rib of the bearing member is within the groove of the hub and thereafter upset the internally beveled end of the hub upon the said collar and clamp the wheel web between the shoulder of the hub and said reinforcing member.

3. The method of assembling wheel and bearing parts as a unit comprising the steps of providing a wheel having a web with a central opening surrounded by an annular inset portion, providing a rigid hub with an externally reduced portion at one end and an annular peripheral groove spaced from its other end, positioning the reduced end portion of the hub in the opening in the wheel web, positioning an annular disc-like collar on the reduced portio of the hub and within the inset portion of the web, providing a bearing member of expandably resilient plastic material having an internal rib adapted to receive the groove in the hub, inserting the outer end of the hub in the bearing member and placing the bearing member on a support, and applying endwise thrust to the reduced end of the hub to expand and to force the hub through the bearing member to position the rib within the groove and position the end of the hub in supported engagement with the support and then upset the reduced end of the hub upon the said collar and clamp the wheel web between the shoulder of the hub and said collar.

4. The method of assembling wheel and bearing parts as a unit comprising the steps of providing a wheel having a web with a central opening providing a rigid hub with an externally reduced portion at one end and an annular peripheral groove spaced from its other end, positioning the reduced end portion of the hub in the opening in the wheel web, positioning a collar on the reduced portion of the hub, providing a bearing member of expandably resilient plastic material having an internal rib adapted to receive the groove in the hub, inserting the outer end of the hub in the bearing member and placing the bearing member on a support, and applying endwise thrust to the reduced end of the hub to expand and to force the hub through the bearing member to position the rib within the groove and position the end of the hub in supported engagement with the support and then upset the reduced end of the hub upon the said collar and clamp the wheel web between the shoulder of the hub and said collar.

5. The method of assembling wheel and bearing parts as a unit comprising the steps of providing a wheel having a web with a central opening providing a rigid hub with an externally reduced portion at one end and an annular peripheral groove spaced from its other end, positioning the reduced end portion of the hub in the opening in the wheel web, providing a bearing member of expandably resilient plastic material having an internal rib adapted to receive the groove in the hub, inserting the end of the hub in the bearing member and placing the bearing member on a support, and applying endwise thrust to the reduced end of the hub to expand the bearing member and force the hub therethrough to position the rib within the groove and position the end of the hub in supported engagement with the support and then upset the reduced end of the hub to clamp the wheel web upon the hub.

References Cited in the file of this patent

UNITED STATES PATENTS

| | | |
|---|---|---|
| 1,884,155 | Oestnaes et al. | Oct. 25, 1932 |
| 2,034,090 | Douglas | Mar. 17, 1936 |
| 2,239,125 | Summers | Apr. 22, 1941 |
| 2,271,746 | Schmalz | Feb. 3, 1942 |
| 2,449,438 | Wisegarver | Sept. 14, 1948 |